United States Patent
Reeves et al.

(10) Patent No.: US 7,584,282 B2
(45) Date of Patent: Sep. 1, 2009

(54) OBJECT-BASED SERVICE ORIENTED ARCHITECTURE METHOD, APPARATUS AND MEDIA

(75) Inventors: Drue Reeves, Round Rock, TX (US); Tim Abels, Pflugerville, TX (US); Manoj Gujarathi, Round Rock, TX (US); Jimmy D. Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 452 days.

(21) Appl. No.: 11/537,649

(22) Filed: Sep. 30, 2006

(65) Prior Publication Data

US 2008/0082656 A1 Apr. 3, 2008

(51) Int. Cl.
*G06F 15/16* (2006.01)
*G06F 12/00* (2006.01)

(52) U.S. Cl. .................. 709/226; 709/250

(58) Field of Classification Search ......... 709/226–228, 709/238, 250, 217–223
See application file for complete search history.

(56) References Cited

U.S. PATENT DOCUMENTS

| | | | |
|---|---|---|---|
| 6,466,972 B1 | 10/2002 | Paul et al. | |
| 6,505,238 B1 * | 1/2003 | Tran | 709/208 |
| 6,922,834 B1 * | 7/2005 | Okamura | 719/310 |
| 6,983,317 B1 | 1/2006 | Bishop et al. | |
| 7,020,697 B1 | 3/2006 | Goodman et al. | |
| 2002/0052941 A1 | 5/2002 | Patterson | |
| 2006/0004868 A1 * | 1/2006 | Claudatos et al. | 707/104.1 |
| 2006/0010445 A1 * | 1/2006 | Peterson et al. | 718/100 |
| 2007/0282652 A1 * | 12/2007 | Childress et al. | 705/8 |

* cited by examiner

*Primary Examiner*—Zarni Maung
(74) *Attorney, Agent, or Firm*—Pramudji Wendt & Tran, LLP

(57) ABSTRACT

An information handling system having a processor and a computer readable medium accessible by the processor and having stored thereon a data structure operable as a directory service. The data structure includes a field comprising a service level object representing a service and comprising data defining roles for the service level object, policies for service level object, and service oriented architecture polices for the service level object. The data structure also includes a field comprising a hardware-level map object subordinate to and in relationship with the service level object, representing hardware or software supporting the service, and comprising data defining roles for the hardware-level map object, policies for the hardware-level map object, and service oriented architecture polices for the hardware-level map object.

16 Claims, 3 Drawing Sheets

OBJECT-BASED SERVICE ORIENTED ARCHITECTURE METHOD, APPARATUS AND MEDIA

BACKGROUND

1. Technical Field

The present disclosure relates generally to information handling systems and, more particularly, to enterprise architecture.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary merely presents some concepts of the disclosure in a general form as a prelude to the more detailed description that follows.

According to one non-limiting embodiment there is provided a computer readable medium having stored thereon a data structure operable as a directory service. As a non-limiting description, the data structure includes a first data field comprising an service level object representing a service and comprising data defining roles for the service level object, policies for service level object, and service oriented architecture polices for the service level object. The data service also includes a second data field comprising a hardware-level map object subordinate to and in relationship with the service level object, representing hardware or software supporting the service, and comprising data defining roles for the hardware-level map object, policies for the hardware-level map object, and service oriented architecture polices for the hardware-level map object.

According to another non-limiting embodiment there is provided a method of operating an information handling system in response to a predetermined event. The method may include running a software application. The method may also include monitoring an event external to and effecting the information handling system to which the system will respond. The method may even include accessing a directory service with the software application. The method may still include generating instructions derived from the data structure to respond to the event. The directory service comprises data relating to the event and configured to have an service level object representing a service and comprising data defining roles for the service level object, policies for service level object, and service oriented architecture polices for the service level object. The directory service may also include a hardware-level map object subordinate to and in relationship with the service level object, representing hardware or software supporting the service, and comprising data defining roles for the hardware-level map object, policies for the hardware-level map object, and service oriented architecture polices for the hardware-level map object.

According to another embodiment there is provided an information handling system comprising a processor, and computer readable medium accessible by the processor. The medium has stored thereon a data structure operable as a directory service. This data structure includes an service level object representing a service and comprising data defining roles for the service level object, policies for service level object, and service oriented architecture polices for the service level object. The data structure further includes a hardware-level map object subordinate to and in relationship with the service level representing hardware or software supporting the service, and comprising data defining roles for the hardware-level map object, policies for the hardware-level map object, and service oriented architecture polices for the hardware-level map object.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

Figure 1:
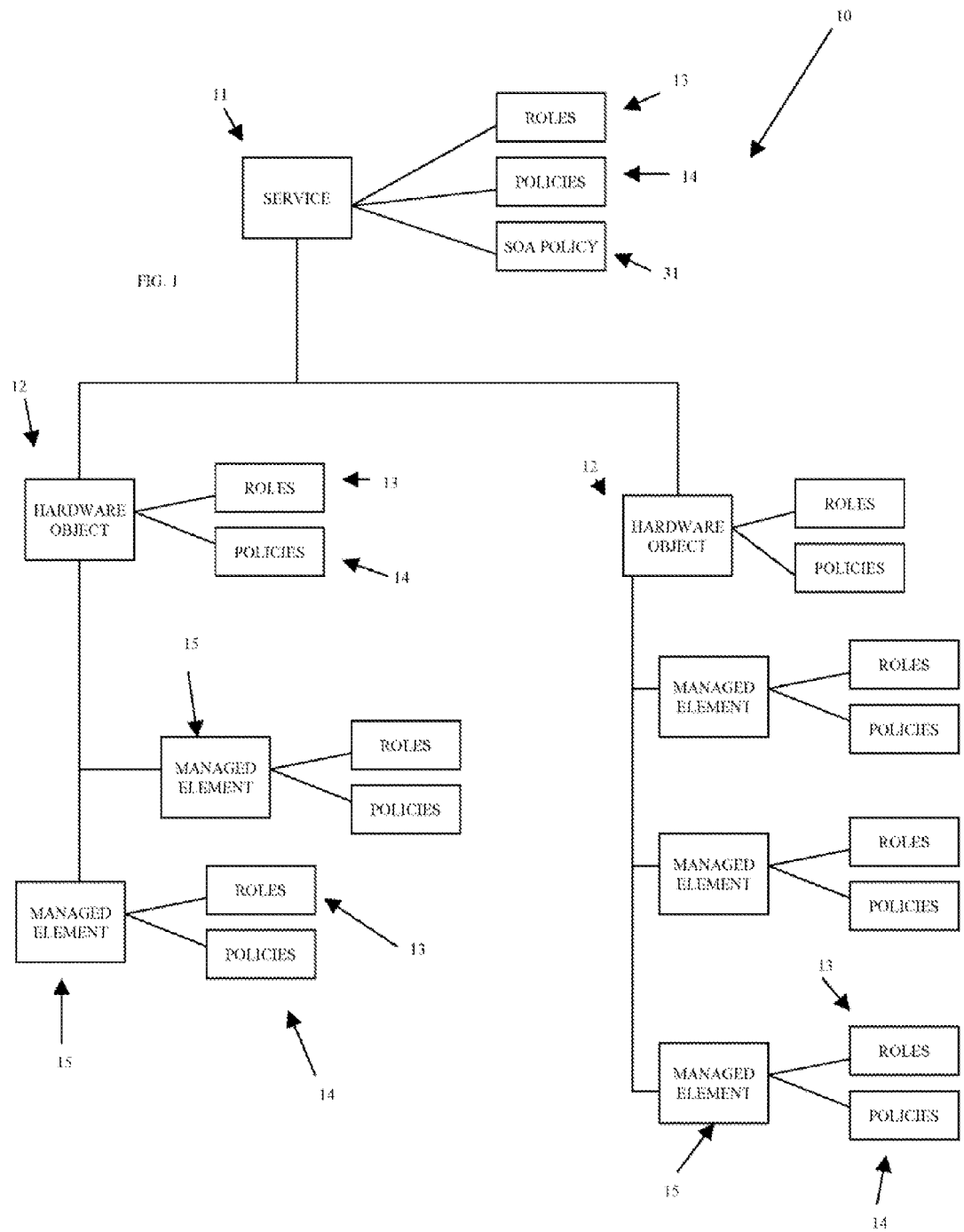
FIG. 1 is a schematic representation of a non-limiting embodiment of directory service 10.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic: ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

A directory service is a software application or a set of applications that stores and organizes information about a computer network's users and network shares, and that allows network administrators to manage users' access to the shares. Additionally, directory services act as an abstraction layer between users and shared resources.

A directory service should not be confused with the directory repository itself, which is the database that holds information about named objects that are managed in the directory service. In the case of the certain distributed directory services model, one or more name spaces (trees of objects) are used to form the directory service. The directory service provides the access interface to the data that is contained in one or more directory name spaces. The directory service interface acts as a central/common authority that can securely authenticate the system resources that manage the directory data.

As per a database, a directory service is highly optimized for reads and provides advanced search on the many different attributes that can be associated with objects in a directory. The data that is stored in the directory is defined by an extendible and modifiable schema. Directory services use a distributed model for storing their information and that information is usually replicated between directory servers.

With the growth of the internet and globalization of business, the computer systems and networks that businesses use have become extremely complicated. In recent years, businesses have moved towards using Enterprise Architecture to manage business networks. Enterprise Architecture is the application of a comprehensive and rigorous method for describing a current or future structure for an organization's processes, information systems, personnel and organizational sub-units, so that they align with the organization's core goals and strategic direction. Generally, Enterprise Architecture is related to business optimization in that it addresses business architecture, performance management and process architecture as well as information technology. While the following disclosure mainly discusses complex computer networks in an enterprise architecture, the invention is not limited to complex computer networks or computer networks. For example, the inventory of a business may be a component of systems discussed below.

There are many companies manufacturing or developing hardware and/or software for use in large scale business network environments. As a business develops, hardware and software products wilt be acquired to expand or improve an enterprise network system to manage growing demands. Because these new or existing businesses typically do not purchase everything from the same hardware/software manufacturer, new hardware or software components may not be compatible with the currently used components purchased in the past. One option is to purchase a new set of hardware and software that is known to be compatible when new demands arise. However, because of the tack of predictability in a businesses future need, purchasing an entirely new set of hardware and software components to meet business demands is rarely feasible and is in many cases uneconomical, One of the methods used to allow complex architecture to work properly has been to create custom coding and scripting to manage interaction and communication between disparate devices and software packages to accomplish desired tasks. Another method is to create custom shims/applications that act as resource managers emulating human interaction. However, custom shims/applications are cumbersome, not scalable, prone to failure, and have security problems.

Service Oriented Architecture (SOA) is a business-driven approach to software architecture that supports integrating the business as a set of linked, repeatable business tasks, or "services". Services are self-contained, reusable software modules with well-defined interfaces and are independent of applications and the computing platforms on which they run. SOA helps businesses innovate by ensuring that a company's information technology system can adapt quickly, easily and economically to support rapidly changing business needs.

The present non-limiting disclosure illustrates an SOA approach to create a data structure operable as a directory service organizing managed elements of hardware and software according to a physical and/or logical relationship. In more detail, this disclosure addresses the complexity of managing relationships between managed elements (software and hardware) by utilizing a directory service to group these devices into service oriented associations as defined by the data center and mapping objects. In a non-limiting embodiment, self describing objects are created where the actual data becomes the interface.

In a computer network, a data center may be utilized to house computer systems and associated components. In a non-limiting example, the data center may include environmental controls (non-limiting examples of which include heating, cooling, and fire suppression), redundant/backup power supplies, redundant internet connections, and access to the data center.

Authorization roles ("roles") and configuration policies ("policies") are associated with various map objects and managed elements in the datacenter. Generally, roles may define an object's or user's access control rights. In a non-limiting example, roles may indicate who/what can create an application, run an application, or make changes. As another non-limiting example, with regard to a memory device, roles may indicate who/what can have full access, read only access, or write only access Further, the roles may contain default access control rights. As a non-limiting example, an "administrator" role may have full access to everything, members of group 1 may have unlimited access to certain memory devices, and members of group 2 may have restricted access to those same memory devices.

Policies are configuration parameters or actions to be performed. In a non-limiting example, policies may indicate the number of available slots, number of memory devices available in inventory, network switching policies, changes to network configuration, and/or configuration or change agents that associate an action with these policies. In addition to operational policies for the hardware and software, business procedures and goals may be implemented through polices. It is not unusual for each managed element and each map object to have both a role and a policy associated with it.

Specific map and sub-map objects are created to group managed elements through dynamic bindings of logical and physical entities. This creates a self-serving infrastructure so that applications can use this infrastructure to provision any managed element or group these into bindings that form a data center.

In FIG. 1, a non-limiting example: a data structure 10 operable as a directory service 10. At a service level is an object representing service 11. At a hardware object level are one or more hardware objects 12 subordinate to and in relationship to service level object 11. Non-limiting examples of a service are server load management, storage provisioning, environment management, or power management. Service 11 may also be associated with role 13, policy 14, and service oriented architecture policy 31.

At a managed element level there are managed element objects 15. The map objects may contain one or more managed element objects 15 which may be subordinate to and in relationship with mid-level objects 12. Additionally, each managed element level map object may be associated with roles 13 and policies 14. Non-limiting examples of managed element level map objects may include a storage area network (SAN) rack, network, stack of services, grouping of software, or a redundant array of independents disks (RAID).

The managed elements 15 can be considered children of map objects 12 or submaps thereof, and the managed elements 15 may also have associated therewith roles 13 and policies 14. A managed element 15 can be any resources in an environment, including policies. Non-limiting examples of managed elements may include servers, switches, laptops, fiber channel switches, Ethernet switches, handheld devices, printers, or applications.

A directory service is created by grouping map objects and managed elements according to their logical and/or physical relationships. In a non-limiting example, a first office may contain several servers, SANs, racks, and/or switches, and a second office may also have several servers, SANs, racks, and/or switches. The directory service maps the hardware and software elements in the first and second offices as map objects and managed elements. These map objects and managed elements may create a directory service that can be used by a client application to manage and control the network. In the non-limiting embodiment discussed above, the map objects and managed elements function as an interface. However, it should be noted that map objects and managed elements do not have to be created according to physical relationships. A directory service may be created based on a logical relationship.

Figure 2:
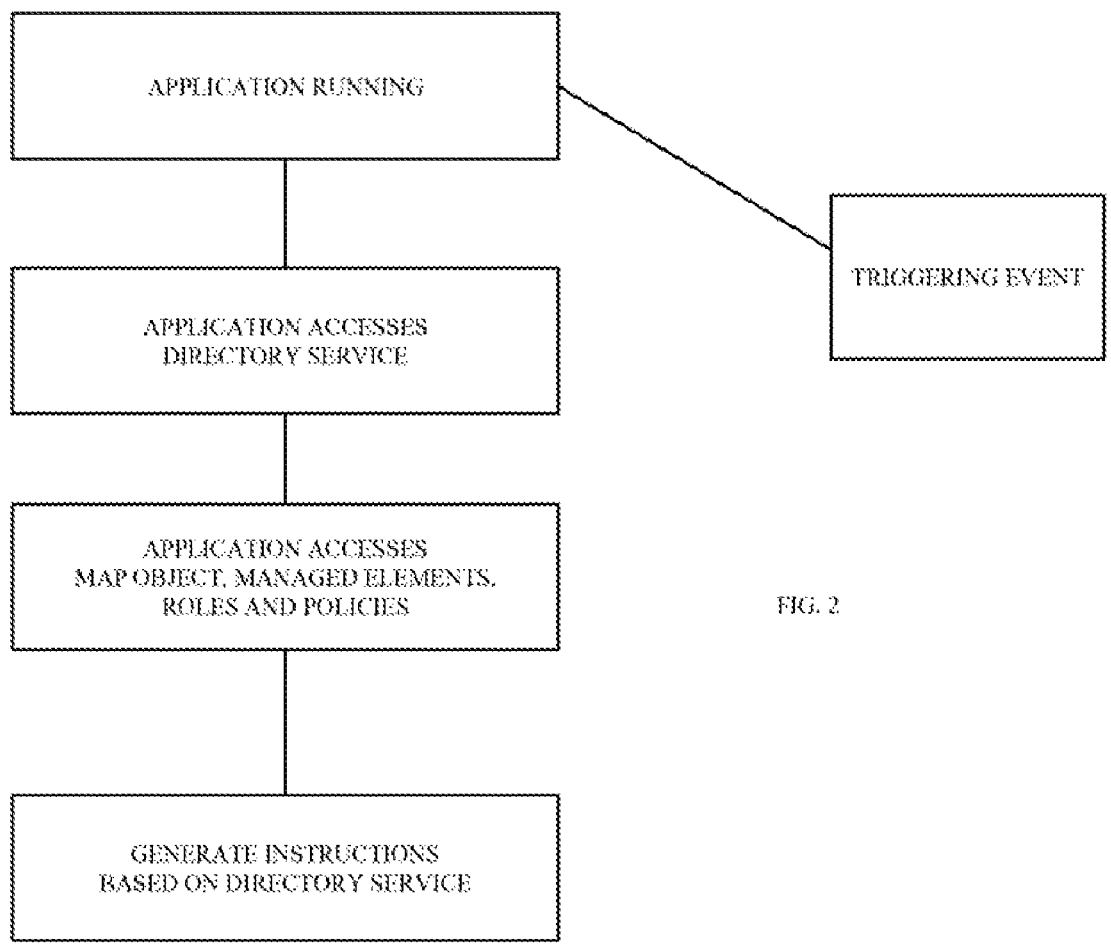
FIG. 2 is a flow chart of a non-limiting embodiment of method 100.

FIG. 2 is a flow chart illustrating a non-limiting example of a method embodiment 100 showing how the directory service may be used by an application to manage and monitor a complex infrastructure. When an application is executing, certain predetermined events may require a response to resolve the situation. These events act as triggers that cause the application to access the directory service. The directory service contains services, map objects, managed elements, and their respective roles and policies. When the application accesses the directory service, the application uses the directory service to determine the proper response to the predetermined event. The application may access certain map objects and managed elements to determine their respective roles and policies. The proper response may require the allocation of certain hardware/software for other uses or the response may simply require data to be sent to a certain location. Finally, instructions to implement the proper response are generated based on the directory service. In this non-limiting embodiment, the actual data in directory service functions as the interface.

Figure 3:
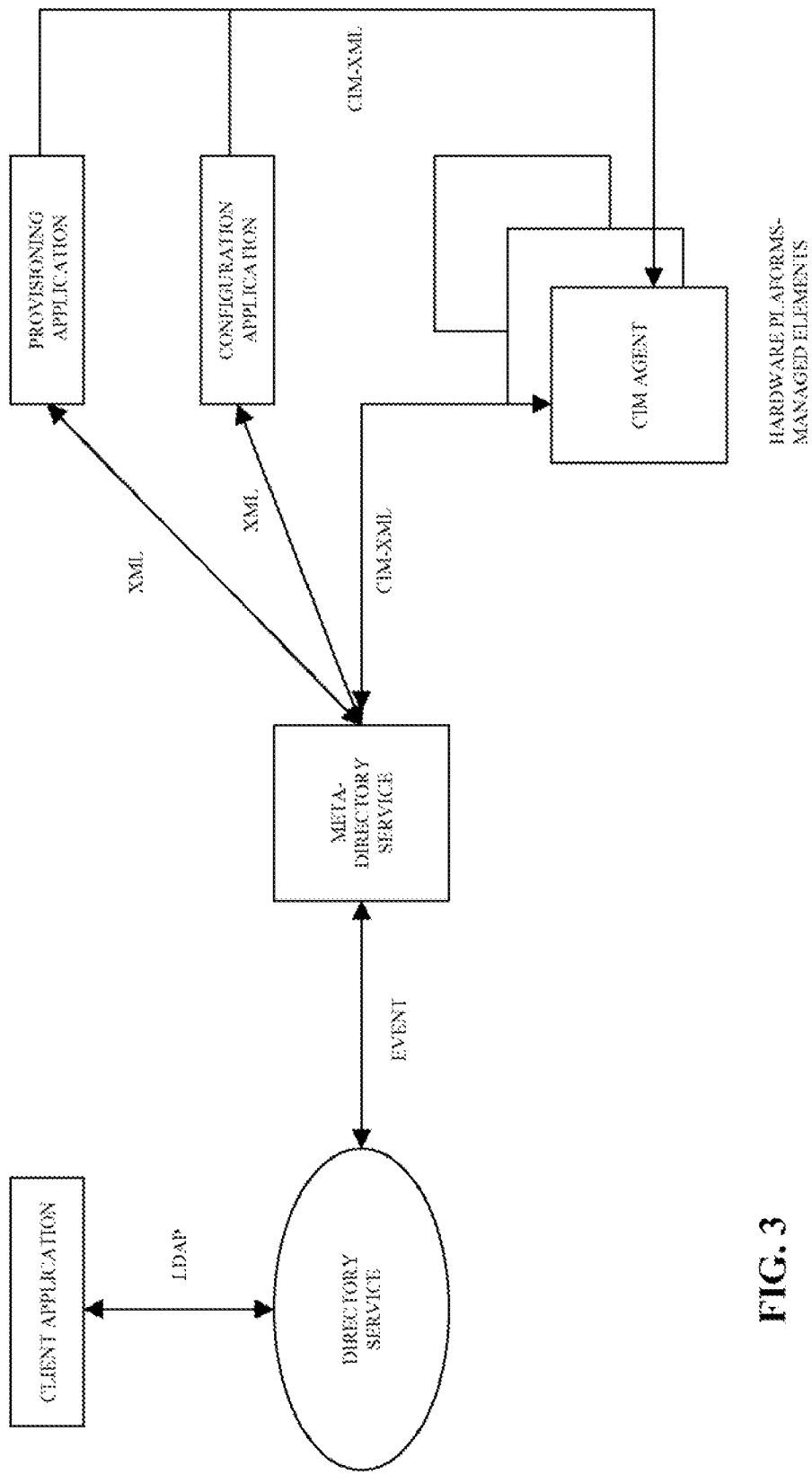
FIG. 3 is a schematic representation of a non-limiting embodiment of a provisioning scenario.

FIG. 3 provides a specific example of how an application may use the directory service. The following example is a non-limiting embodiment of the present disclosure. The example shows how the directory service is used to provision a new server to address increased HTTP traffic during the holiday season. The client application logs into the directory service using Lightweight Directory Access Protocol (LDAP). The application reads the datacenter map object and the policy associated with the map object to parse the policy for the HTTP traffic overload. This may include: the type of server to provision, where to place in the network, Online Transaction Processing (OLTP) traffic and need, etc. Next, the application reads data center managed elements and finds a server matching the requirements. The server is selected for addressing scalability request, and its status is changed from available to reserved. Finally, the meta-directory service creates instructions (for example in XML) with all this data and sends the provisioning application instructions about a new server object to provision.

In non-limiting embodiments, part or all of the data structures described herein may be stored on one or more computer readable media or a propagated signal. In further non-limiting embodiments, part or all of the methods described herein may be described as instructions for an information handling system, and stored on one or more computer readable media or a propagated signal.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

What is claimed is:

1. A computer readable storage medium having stored thereon a data structure operable as a directory service, the data structure comprising:

a first data field comprising a service level object representing a service and comprising data defining roles for the service level object, policies for service level object, and service oriented architecture polices for the service level object; and a second data field comprising a hardware-level map object subordinate to and in relationship with the service level object, representing hardware or software supporting the service, and comprising data defining roles for the hardware-level map object, policies for the hardware-level map object, and service oriented architecture polices for the hardware-level map object; and wherein the director service is created by mapping a hardware element to the hardware-level map object, the direct service operable to organize information related to network users and network shares, allowing management of access to the network shares by the network users.

2. The computer readable medium of claim 1, wherein the data structure further comprises a managed element level map object subordinate to and in relationship with the hardware-level object, representing hardware or software supporting the service, and comprising data defining roles for the managed element level map object, policies for managed element level map object, and service oriented architecture polices for the managed element level map object.

3. The computer readable medium of claim 1, wherein the service represented comprises a data center.

4. The computer readable medium of claim 3, wherein hardware-level map level object comprises a first object representing a rack, and a second object representing a storage area network.

5. The computer readable medium of claim 4, wherein the data structure further comprises a managed element level map object subordinate to and in relationship with the hardware-level object, representing server, storage device, or switch, supporting the service, and comprising data defining roles for the managed element level map object, policies for managed element level map object, and service oriented architecture polices for the managed element level map object.

6. A method of operating an information handling system comprising:
  executing a software application by a processor of the information handling system;
  monitoring an event external to and effecting the information handling system to which the system will respond;
  accessing a directory service with the software application, the direct service operable to organize information related to network users and network shares, allowing management of access to the network shares by the network users, wherein the directory service comprises data relating to the event and configured with:
    an service level object representing a service and comprising data defining roles for the service level object, policies for service level object, and service oriented architecture polices for the service level object; and
      a hardware-level map object subordinate to and in relationship with the service level object, representing hardware or software supporting the service, and comprising data defining roles for the hardware-level map object, policies for the hardware-level map object, and service oriented architecture polices for the hardware-level map object; and
  generating instructions derived from the data to respond to the event.

7. The method of claim 6, wherein the software application executes the instructions in response to the event.

8. The method of claim 6, wherein the directory service further comprises a managed element level map object subordinate to and in relationship wit tie hardware-level object, representing hardware or software supporting the service, and comprising data defining roles for the managed element level map object, policies for managed element level map object, and service oriented architecture polices for the managed element level map object.

9. The method of claim 6, wherein the directory service represents a data center.

10. The method of claim 9, wherein hardware-level map level object comprises a first object representing a rack, and a second object representing a storage area network.

11. The method of claim 10, wherein the data further comprises a managed element level map object subordinate to and in relationship with the hardware-level object, representing server, storage device, or switch, supporting the service, and comprising data defining roles for the managed element level map object, policies for managed element level map object, and service oriented architecture polices for the managed element level map object.

12. An information handling system comprising:
  a processor;
  computer readable storage medium accessible by the processor and having stored thereon a data structure operable as a directory service, the direct service operable to organize information related to network users and network shares, allowing management of access to the network shares by the network users, the data structure comprising:
    a first field comprising an service level object representing a service and comprising data defining roles for the service level object, policies for service level object, and service oriented architecture polices for the service level object; and
    a second field comprising a hardware-level map object subordinate to and in relationship with the service level object, representing hardware or software supporting the service, and comprising data defining roles for the hardware-level map object, policies for the hardware-level map object, and service oriented architecture polices for the hardware-level map object.

13. The system of claim 12 further comprising an application configured to examine data from the information handling system, wherein the application is configured to communicate with the directory service in order to address an event; and wherein the application uses the directory service to generate instructions that are a function of the data from the information handling system and the directory service to respond to the event.

14. The system of claim 12, wherein the data structure further comprises a managed element level map object subordinate to and in relationship with the hardware-level object, representing hardware or software supporting the service, and comprising data defining roles for the managed element level map object, policies for managed element level map object, and service oriented architecture polices for the managed element level map object.

15. The system of claim 12, wherein the service represented comprises a data center.

16. The system of claim 15, wherein hardware-level map level object comprises a first object representing a rack, and a second object representing a storage area network.

* * * * *